United States Patent
Ono

(10) Patent No.: US 10,102,458 B2
(45) Date of Patent: Oct. 16, 2018

(54) IMAGE PROCESSING APPARATUS FOR GENERATING INTERMEDIATE DATA AND PROCESSING THE INTERMEDIATE DATA, METHOD OF PROCESSING INTERMEDIATE DATA GENERATED FROM PRINT DATA

(71) Applicant: CANON KABUSHIKI KAISHA, Tokyo (JP)

(72) Inventor: Takashi Ono, Kashiwa (JP)

(73) Assignee: Canon Kabushiki Kaisha, Tokyo (JP)

(*) Notice: Subject to any disclaimer, the term of this patent is extended or adjusted under 35 U.S.C. 154(b) by 0 days.

(21) Appl. No.: 15/666,416

(22) Filed: Aug. 1, 2017

(65) Prior Publication Data
US 2018/0039870 A1 Feb. 8, 2018

(30) Foreign Application Priority Data

Aug. 5, 2016 (JP) ................................ 2016-154834

(51) Int. Cl.
G06K 15/00 (2006.01)
G06K 15/02 (2006.01)
(52) U.S. Cl.
CPC ..... G06K 15/1836 (2013.01); G06K 15/1886 (2013.01)
(58) Field of Classification Search
USPC .............. 358/1.1–3.29, 1.11–1.18, 523, 524, 358/426.05, 426.06
See application file for complete search history.

(56) References Cited

U.S. PATENT DOCUMENTS

| 7,003,597 B2* | 2/2006 | Georgiou | H04L 49/90 710/53 |
| 8,537,430 B2* | 9/2013 | Kaneda | H04N 1/0473 358/474 |
| 2008/0204776 A1* | 8/2008 | Wakasa | G06K 15/028 358/1.9 |
| 2012/0133964 A1* | 5/2012 | Hayakawa | G06F 3/1211 358/1.13 |
| 2017/0147913 A1* | 5/2017 | Mori | G06K 15/1813 |

FOREIGN PATENT DOCUMENTS

JP 2014000753 A 1/2014

* cited by examiner

Primary Examiner — Marcellus Augustin
(74) Attorney, Agent, or Firm — Canon U.S.A., Inc. IP Division

(57) ABSTRACT

An image processing apparatus for storing, in an intermediate data memory, intermediate data generated from print data, and processing the intermediate data is provided. The image processing apparatus has a configuration in which, in a case where it is determined that a size of a work memory exceeds a block size after processing for creating a first bit map is started, and where the processing for creating the first bit map is switched to processing for creating a second bit map, when the processing for creating the first bit map is started, processing for creating a bit map is started without delay by using a bit map memory in advance from the work memory.

12 Claims, 19 Drawing Sheets

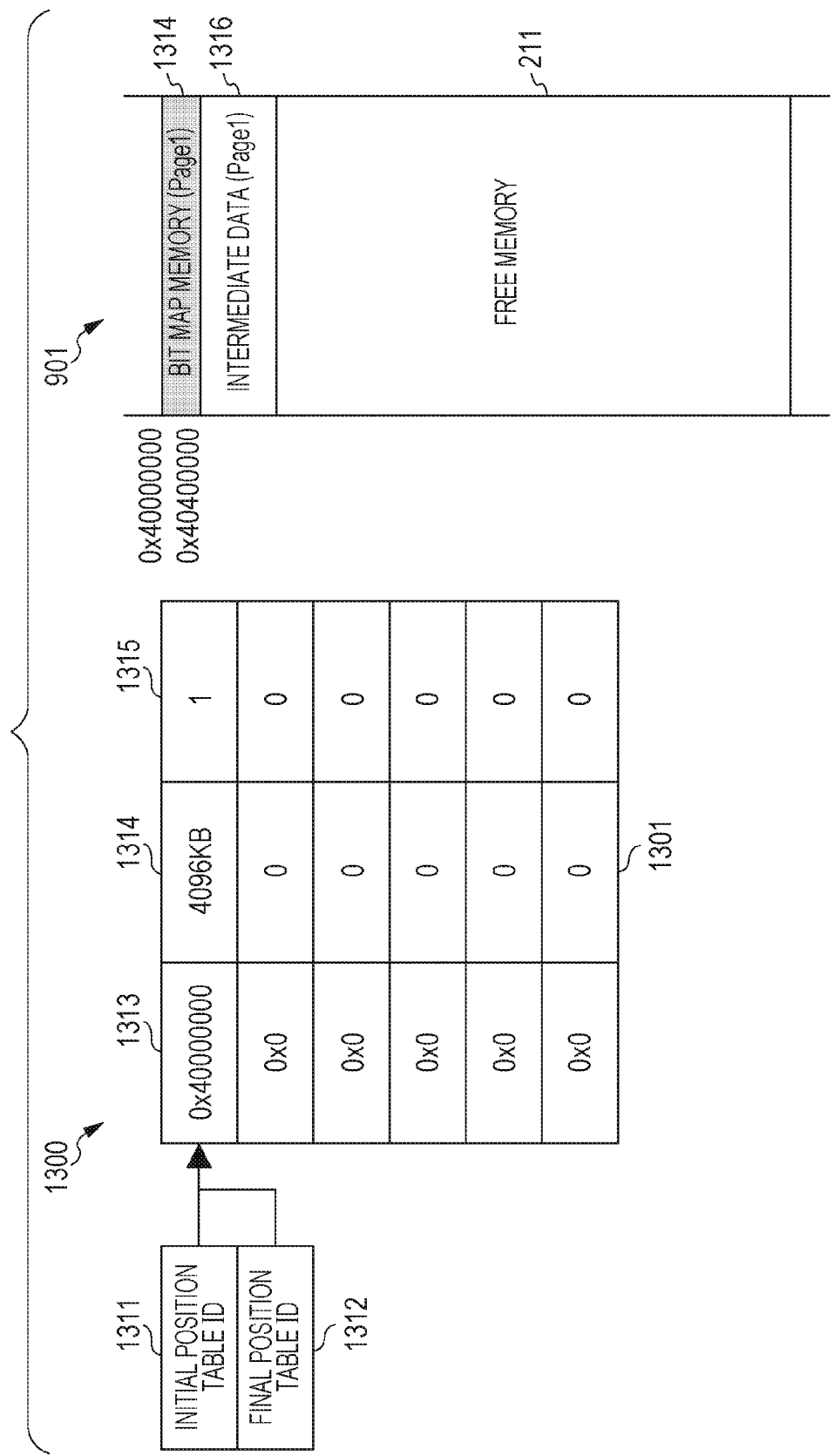

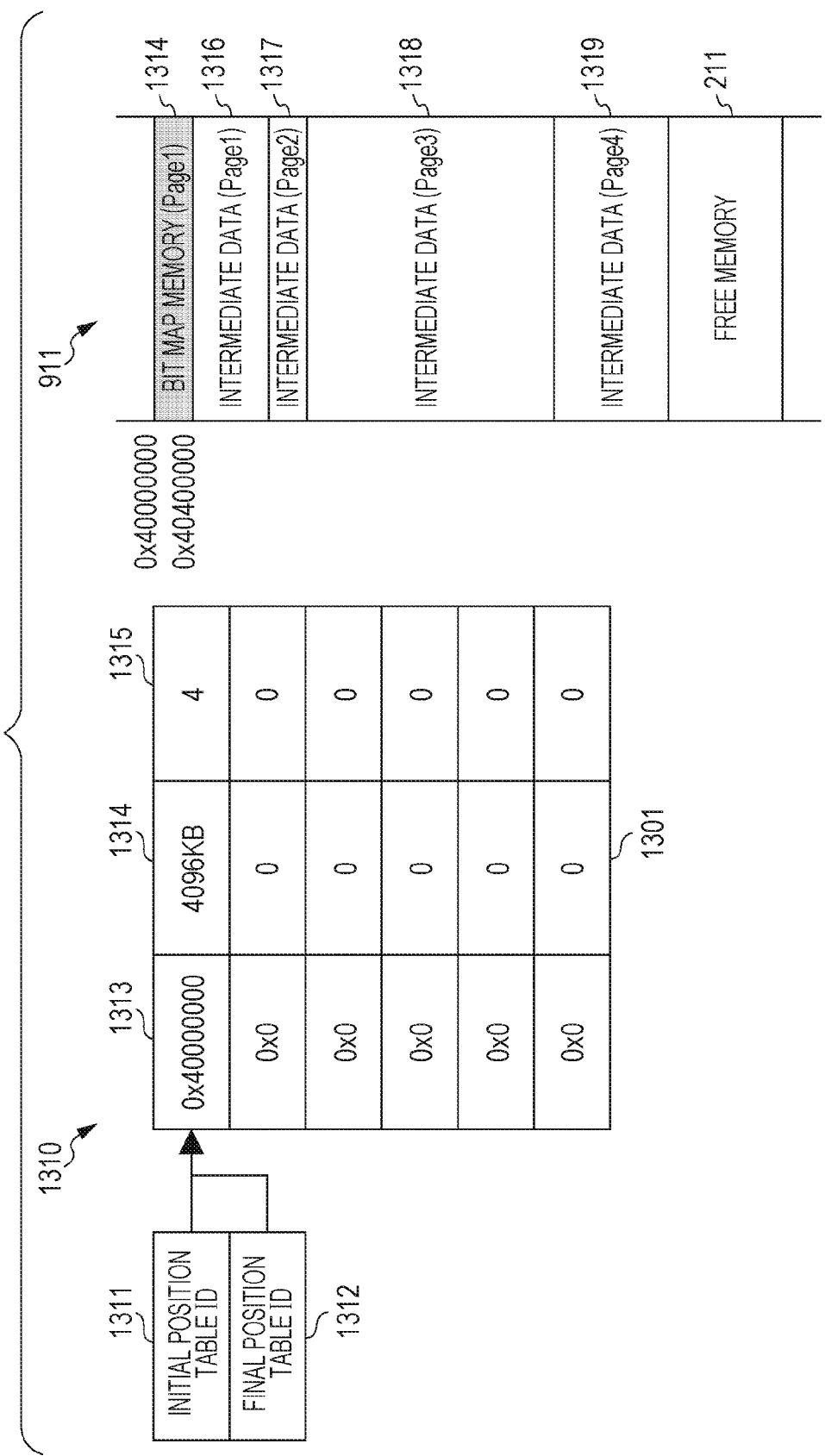

FIG. 14
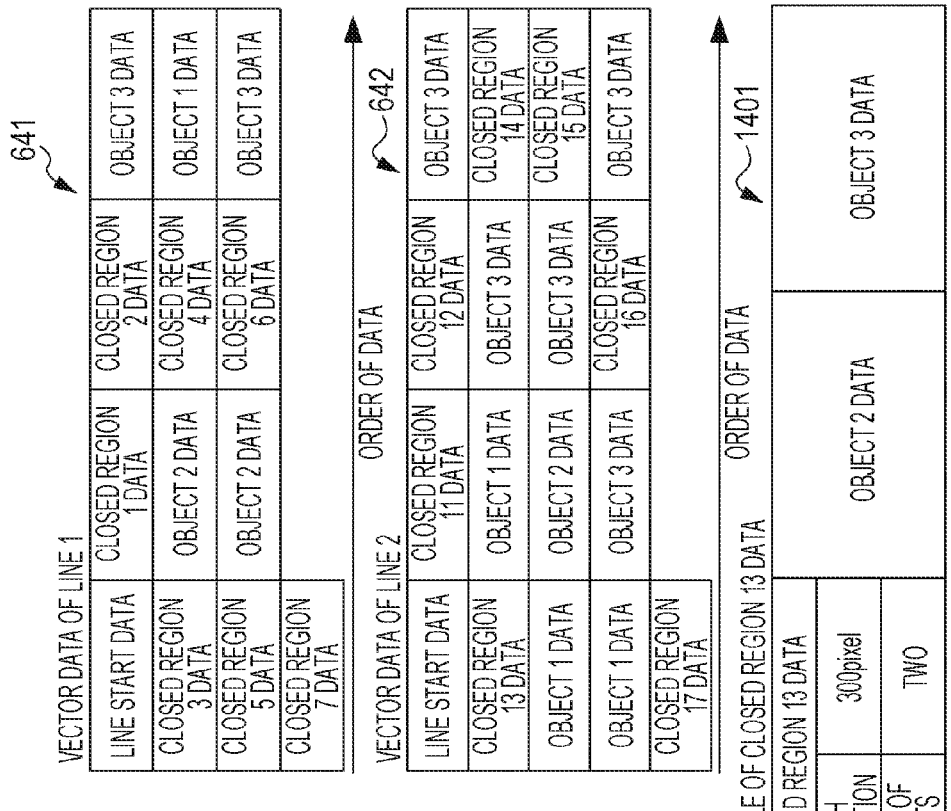
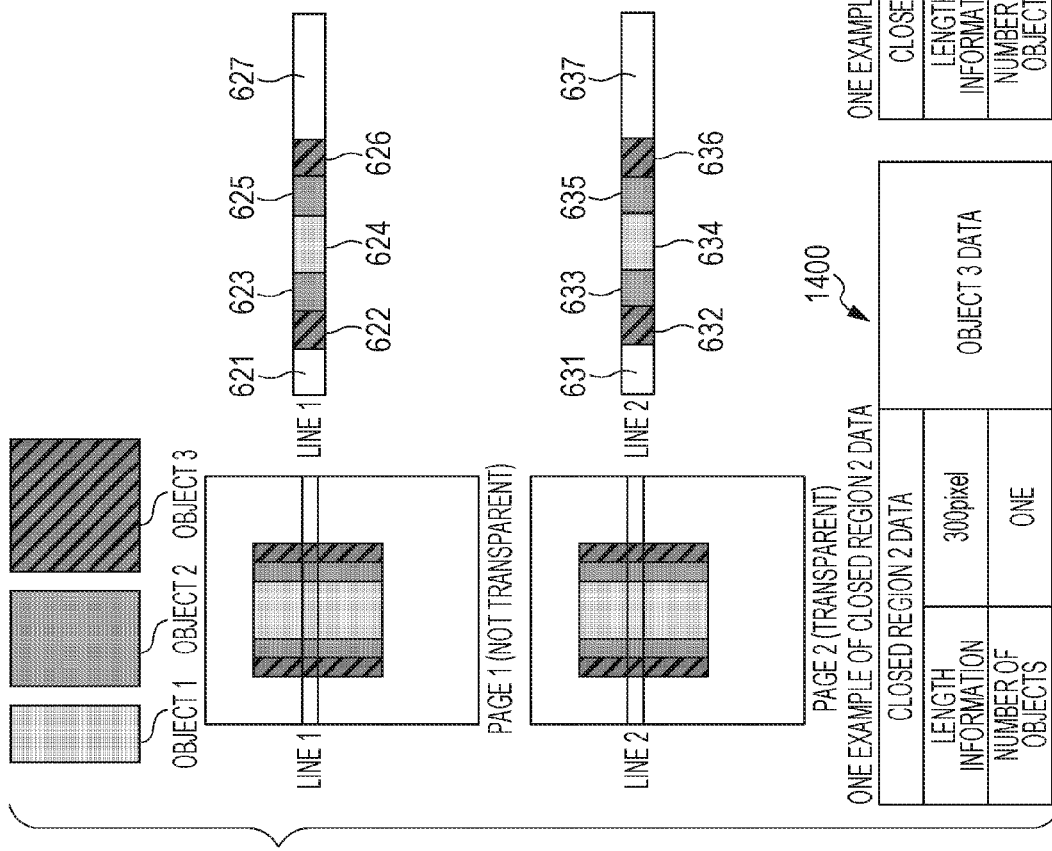

ORDER OF DATA →

ORDER OF DATA →

IMAGE PROCESSING APPARATUS FOR GENERATING INTERMEDIATE DATA AND PROCESSING THE INTERMEDIATE DATA, METHOD OF PROCESSING INTERMEDIATE DATA GENERATED FROM PRINT DATA

BACKGROUND

Field

The present disclosure relates to an image processing apparatus, a method for controlling the image processing apparatus, and a storage medium.

Description of the Related Art

Conventionally, in image processing apparatuses that process image data, there is a technique of printing images at a high speed by converting the image data into image data of each block and performing subsequent image processing in parallel on a block-by-block basis during image drawing processing. The processing for converting the image data into image data of each block is referred to as block forward conversion processing.

In the block forward conversion processing, data of predetermined block height is input into a work memory in page line order, and the data is output in block order.

Japanese Patent Laid-Open No. 2014-753 discloses a method for performing block division of vector-format data that occurs before rasterization and is input into a work memory, and a technique of switching to a method for buffering rasterized image data and performing block division when the work memory fails to accommodate the data.

However, when the block forward conversion processing of Japanese Patent Laid-Open No. 2014-753 is used, it is necessary to acquire a memory for buffering the image data. With the existing art, when there is no free memory for generating intermediate data or no free memory for spooling image data, it is necessary to wait for the memory to be released, and this can cause the process to take longer to complete.

SUMMARY

According to various embodiments of the present disclosure, even when first bit map image creation processing is switched to second bit map image creation processing during generation of intermediate data, necessary bit map memory can be acquired in a work memory without delay.

More specifically, in various embodiments, an image processing apparatus of the present disclosure has the following configuration.

The image processing apparatus stores, in an intermediate data memory, intermediate data generated from print data, and processes the intermediate data. The image processing apparatus includes: a generation unit configured to generate closed region data of one band generated from pagewise intermediate data; a first creation unit configured to store the closed region data of one band generated by the generation unit in a work memory secured in the intermediate data memory and to create a blockwise bit map image from the stored closed region data of one band; a second creation unit configured to develop a bit map image of one band from the closed region data of one band generated from the pagewise intermediate data in the work memory secured in the intermediate data memory, the second creation unit being configured to create a blockwise bit map image from the bit map image of one band developed in the work memory; a determination unit configured to determine whether a size of the work memory secured in the intermediate data memory exceeds a block size to be used for block conversion; a control unit configured, when the determination unit determines that the size of the work memory exceeds the block size, to switch processing by the first creation unit to create a bit map, to processing by the second creation unit to create a bit map; and a memory management unit configured, when the first creation unit starts processing for creating a bit map, to previously secure a bit map memory to be used by the second creation unit in the work memory.

Further features will become apparent from the following description of exemplary embodiments (with reference to the attached drawings).

BRIEF DESCRIPTION OF THE DRAWINGS

FIGS. 13A to 13B are diagrams each illustrating a bit map memory and intermediate data secured in a memory according to one embodiment.

FIG. 14 is a diagram illustrating one example of closed region data according to one embodiment.

DESCRIPTION OF THE EMBODIMENTS

Figure 15A:
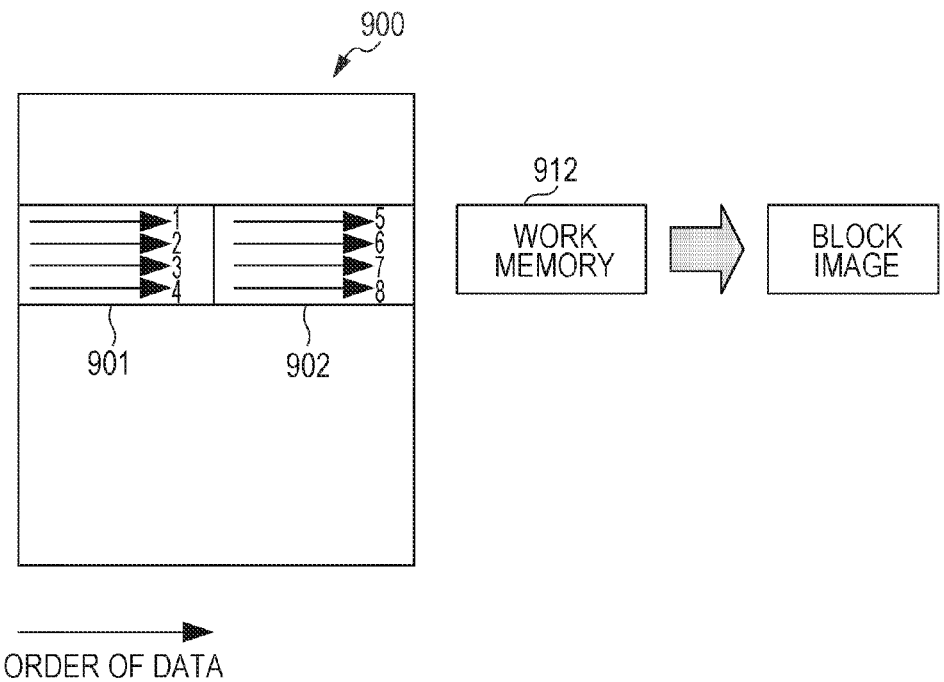
FIGS. 15A and 15B are diagrams each illustrating block drawing processing in the image processing apparatus according to one embodiment.
Figure 15B:
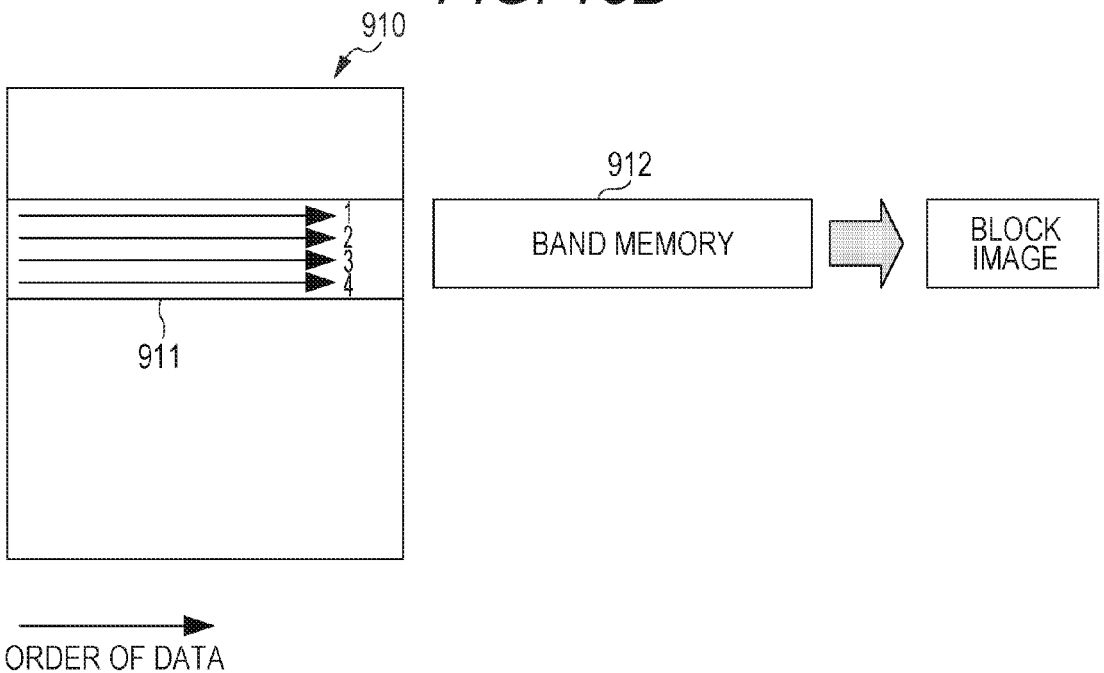

To begin with, block forward conversion will be described with reference to FIGS. 15A, 15B, and 16. FIG. 15A illustrates one example of block forward conversion 900 in a vector format. FIG. 15B illustrates one example of block forward conversion 910 in a raster format. Since the block forward conversion 900 in a vector format of FIG. 15A divides vector data into blocks 901 and 902, a work memory for normal data is small. However, since certain data needs a large work memory, the block forward conversion is switched to the block forward conversion 910 in a raster format illustrated in FIG. 15B, a band memory 912 is secured, rasterized image data is divided into blocks, and each block is output.

Figure 16:
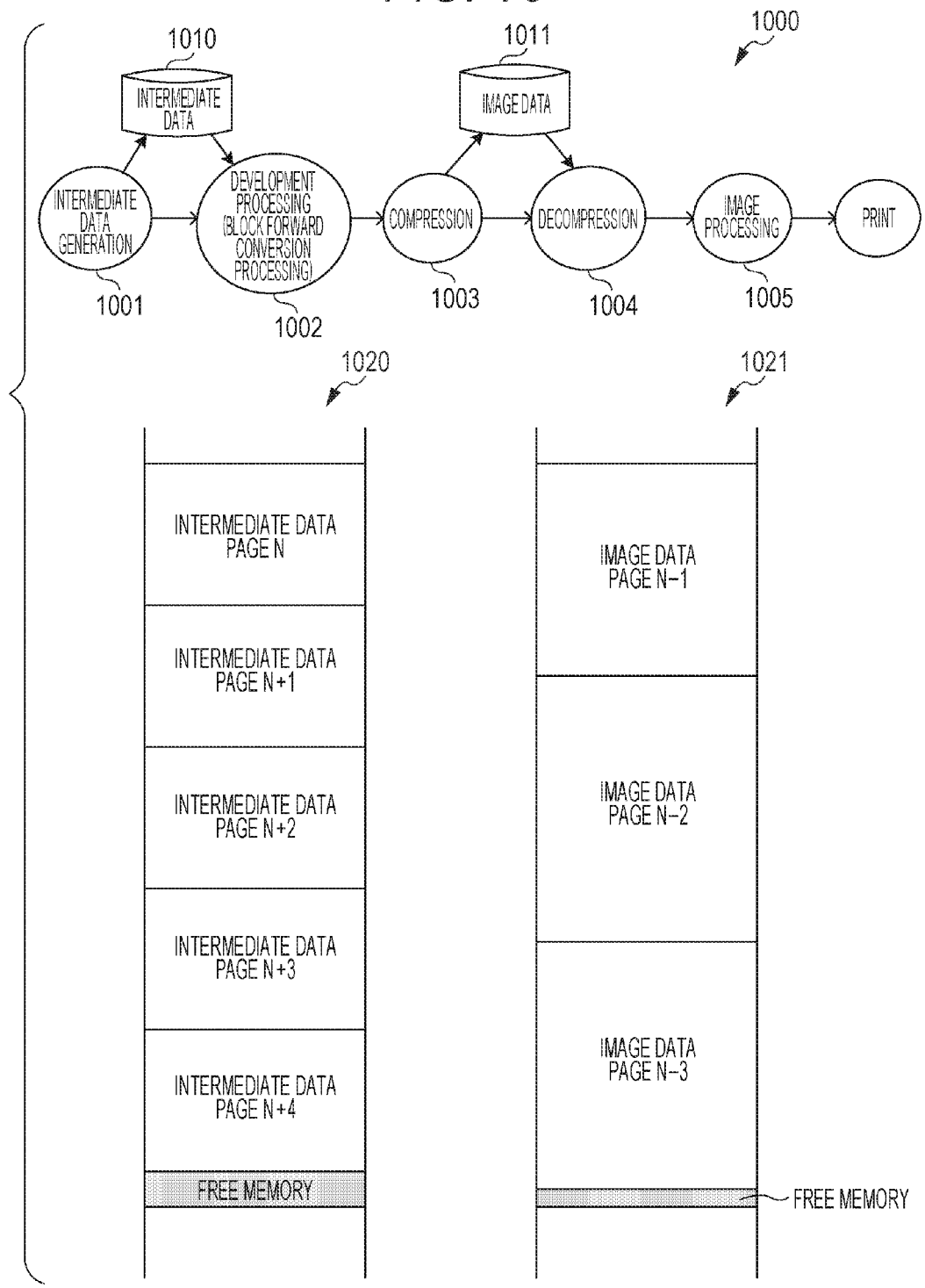
FIG. 16 is a diagram illustrating block drawing processing in the image processing apparatus according to one embodiment.

Specific description will be provided with reference to a print processing flow 1000 illustrated in FIG. 16. An image data spool 1011 already contains therein a plurality of pages of image data developed by development processing 1002, and therefore the image data spool 1011 has only a small free memory. Also, an intermediate data spool (1010) contains a plurality of pages of intermediate data generated by intermediate data generation 1001, and therefore the intermediate data spool 1010 has only a small free memory. Even if a bit map memory is required by the development processing 1002 in this state, the free memory is insufficient and a necessary memory cannot be acquired, and thus the development processing 1002 will wait for the print processing to end due to memory shortage.

<Description of System Configuration>

First Embodiment

<System Configuration>

Figure 1:
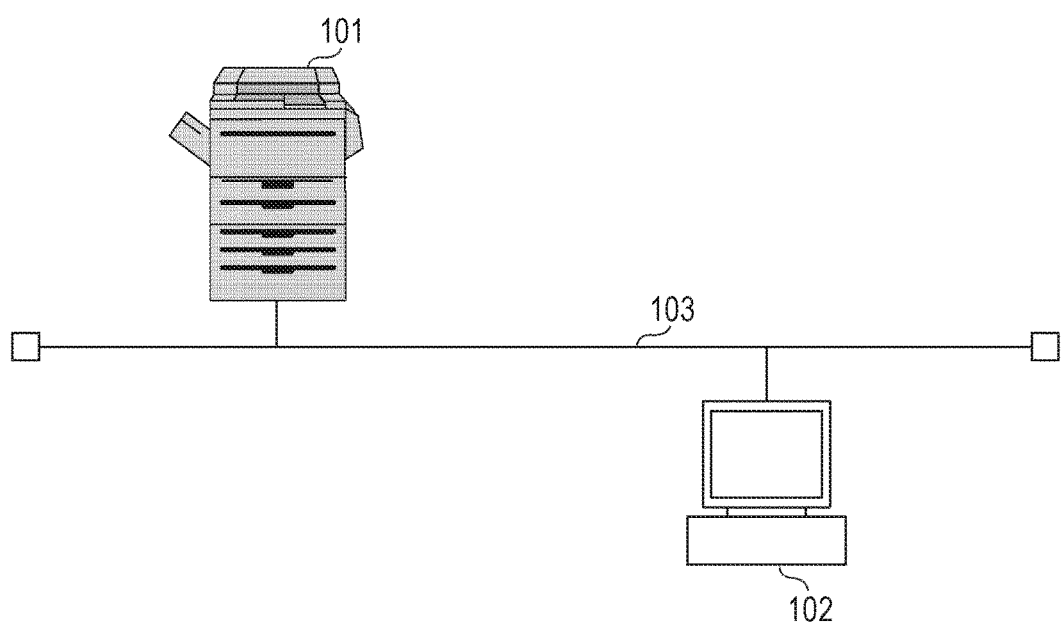
FIG. 1 is a diagram illustrating a configuration of a data processing system according to one embodiment.

FIG. 1 is a diagram illustrating a configuration of a data processing system including an image processing apparatus indicating an embodiment of the present disclosure. This system has a configuration in which an image formation apparatus 101 and an image processing apparatus 102 are connected to each other over a network 103.

In FIG. 1, when a user performs printing using an application for the image processing apparatus 102, print data is generated by a driver and transmitted to the image formation apparatus 101 over the network 103. The image formation apparatus 101 performs printing on the basis of the print data.

<Hardware Configuration of Image Formation Apparatus>

Figure 2:
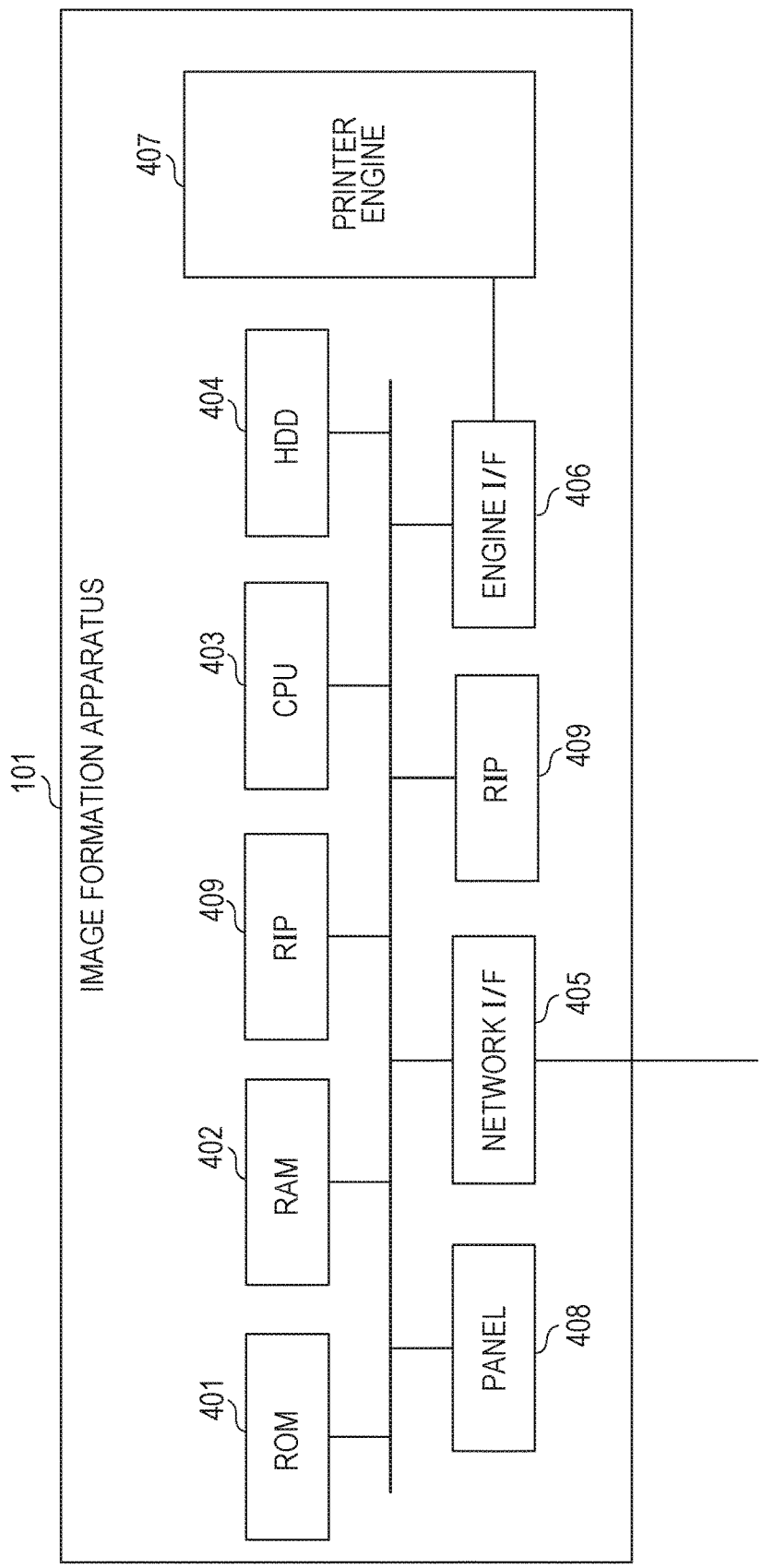
FIG. 2 is a block diagram illustrating a hardware configuration of an image formation apparatus according to one embodiment.

FIG. 2 is a block diagram illustrating a hardware configuration of the image formation apparatus 101 illustrated in FIG. 1. In FIG. 2, the image formation apparatus 101 includes a read-only memory (ROM) 401, a random-access memory (RAM) 402, a central processing unit (CPU) 403, a hard disk drive (HDD) 404, a network interface (I/F) 405, an engine I/F 406, a printer engine 407, a panel 408, and a raster image processor (RIP) 409.

The ROM 401 is a nonvolatile memory in which programs for processing units of the image formation apparatus 101 are stored. The RAM 402 is a volatile memory in which the programs for processing units stored in the ROM 401 are developed when power is turned on. The RAM 402 also serves as a primary storage region for storing information to be read and written by the processing units at a high speed. The CPU 403 is a computing processor that executes the programs for the processing units developed in the RAM 402. The HDD 404 is a storage device capable of storing a large quantity of information. The HDD 404 serves as a secondary storage region for storing the print data transmitted from the image processing apparatus 102, intermediate data, which is output data from the processing units, and image data.

The network I/F 405 communicates with the image processing apparatus 102 over the network 103. The engine I/F 406 converts image data, which is final output data of each processing unit, into video data, and then outputs the video data to the printer engine 407. The printer engine 407 performs printing on paper on the basis of the video data by an unillustrated print process. The panel 408 displays a user interface (UI) for receiving settings and instructions from the user, and messages such as a processing status and an error. The RIP 409 develops the intermediate data generated on the basis of the print data into image data. It is possible to simultaneously perform software processing to be executed by the CPU 403, image data development to be performed by the RIP 409, and video data output from the engine I/F 406.

<Software Configuration of Image Formation Apparatus>

Figure 3:
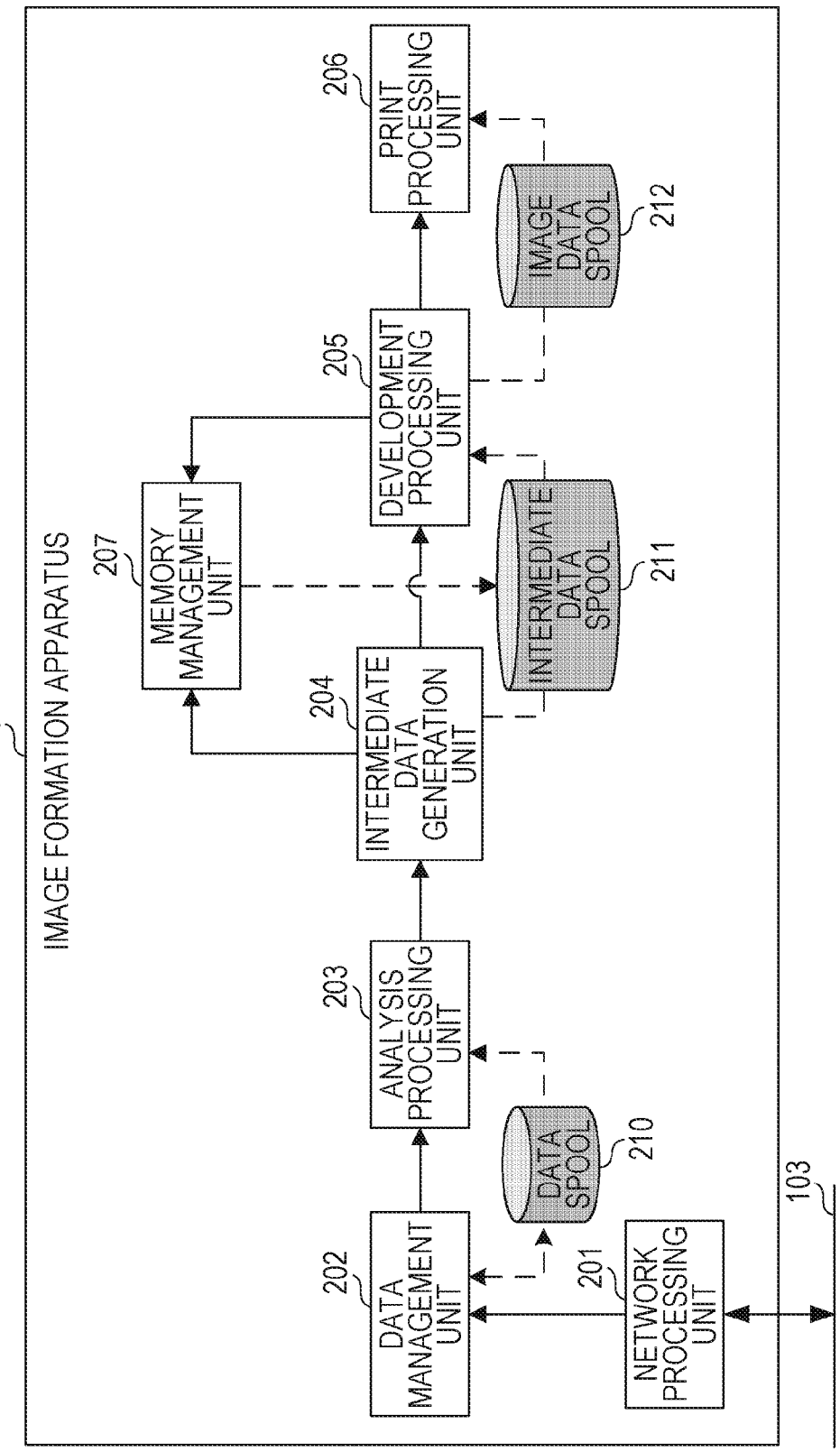
FIG. 3 is a diagram illustrating a software configuration of the image formation apparatus according to one embodiment.

FIG. 3 is a diagram illustrating a software configuration of the image formation apparatus 101 illustrated in FIG. 1.

In FIG. 3, a network processing unit 201 receives the print data transmitted over the network 103 and delivers the received print data to a data management unit 202. The data management unit 202 stores the print data received by the network processing unit 201 in a data spool 210. An analysis processing unit 203 analyzes the print data stored in the data spool 210, and requests an intermediate data generation unit 204 to generate intermediate data. The intermediate data generation unit 204 converts each command analyzed by the analysis processing unit 203 into intermediate data processible by a development processing unit 205. For print execution, the intermediate data generation unit 204 generates the intermediate data and stores the generated intermediate data in an intermediate data spool 211 configured as an intermediate data memory.

The development processing unit 205 develops the intermediate data stored in the intermediate data spool 211 into image data, and stores the image data in an image data spool 212. A print processing unit 206 prints the image data stored in the image data spool 212 with the printer engine 407. A memory management unit 207 manages the intermediate data spool 211 that stores the intermediate data generated by the intermediate data generation unit 204. The memory management unit 207 secures a region in the intermediate data spool 211 in response to a request of the intermediate data generation unit 204. Also, in response to an instruction of the development processing unit 205, the memory management unit 207 releases a storage region for the intermediate data on which processing by the development processing unit 205 has ended.

The data spool 210 stores the print data received by the network processing unit 201. The intermediate data spool 211 stores the intermediate data generated by the analysis processing unit 203. The image data spool 212 stores the image data developed by the development processing unit 205. Regions for the data spool 210, the intermediate data spool 211, and the image data spool 212 are secured in the RAM 402 or the HDD 404 for storing data.

<Print Processing Flow>

Figure 4:
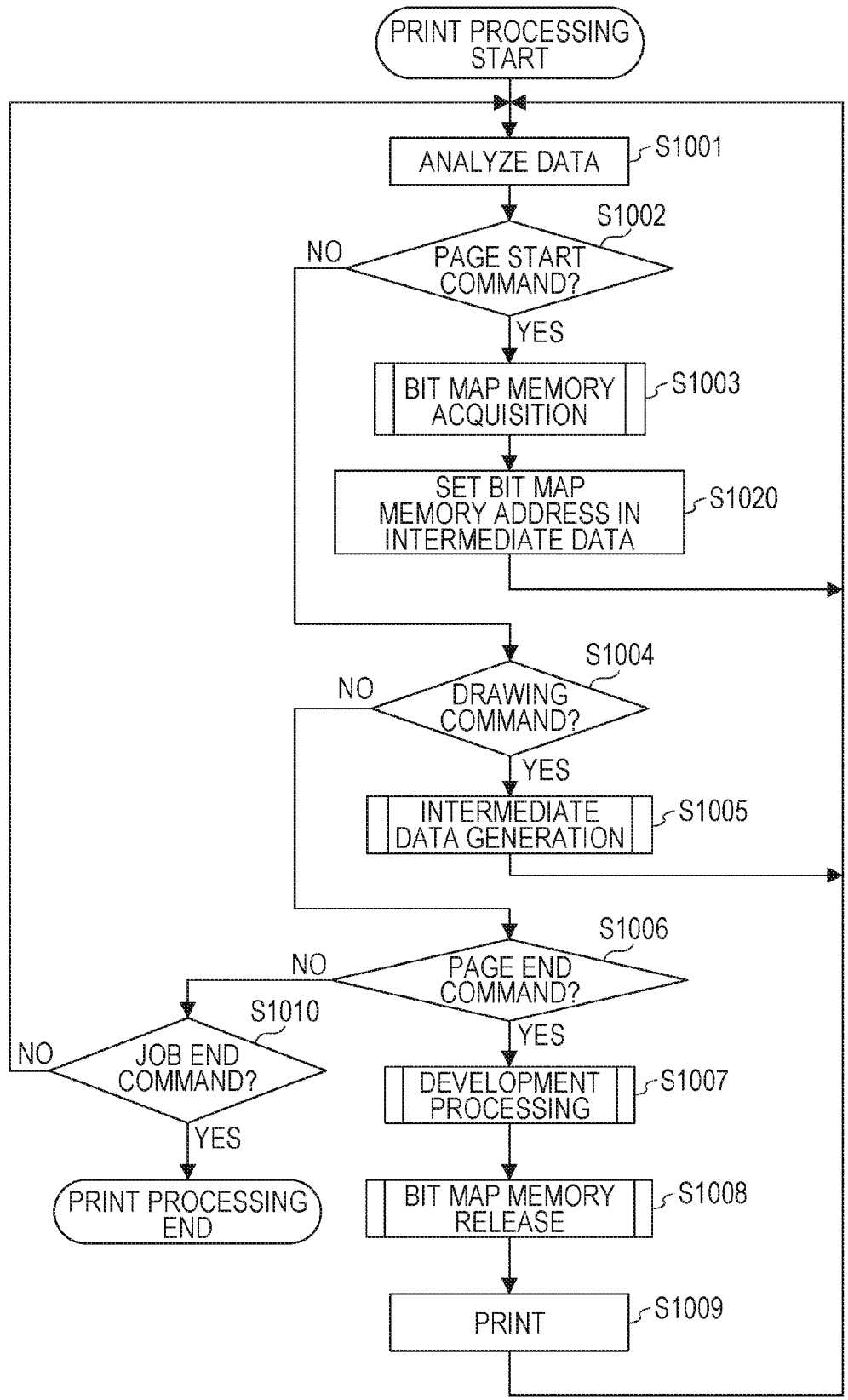
FIG. 4 is a flowchart illustrating a method for controlling an image processing apparatus according to one embodiment.

FIG. 4 is a flowchart illustrating a method for controlling the image processing apparatus indicating the present embodiment. This example is an exemplary print processing of the print data of the image formation apparatus 101 illustrated in FIG. 1. Each step is implemented by the CPU 403 executing a stored control program. The following principally describes modules to be executed by the CPU 403 illustrated in FIG. 3.

Upon receipt of print bit map data from the network I/F 405 over the network 103, the analysis processing unit 203 requests the print data stored in the data spool 210 from the data management unit 202, and analyzes a command in the print data (S1001). When the analysis processing unit 203 analyzes the command and then determines that the command is a page start command (S1002), the memory management unit 207 makes a request for acquiring a bit map memory, and secures the bit map memory (S1003).

Next, the memory management unit 207 sets an address of the secured bit map memory in the intermediate data (S1020).

In a case where it is determined as NO in S1002, and when the analysis processing unit 203 determines that the command in the print data is a drawing command (S1004), the intermediate data generation unit 204 generates the intermediate data, and stores the intermediate data in the intermediate data spool 211 secured by the memory management unit 207 (S1005).

Until the analysis processing unit 203 detects a page end command (S1006), data analysis processing (S1001) and intermediate data generation processing (S1005) are performed repeatedly.

Then, when the analysis processing unit 203 detects the page end command (S1006), the development processing unit 205 performs development processing in accordance with the intermediate data stored in the intermediate data spool 211, and then stores block image data in the image data spool 212 (S1007). Next, the development processing unit 205 requests release of the bit map memory from the memory management unit 207 (S1008). Next, the print processing unit 206 performs predetermined image processing on the block image data stored in the image data spool 212, outputs the block image data to the printer engine 407 via the engine I/F 406, and performs printing (S1009).

Then, until the analysis processing unit 203 detects a job end command (S1010), processing from data analysis processing (S1001) to print processing (S1009) of all pages is performed repeatedly.

<Intermediate Data Generation Processing Flow>

Figure 5:
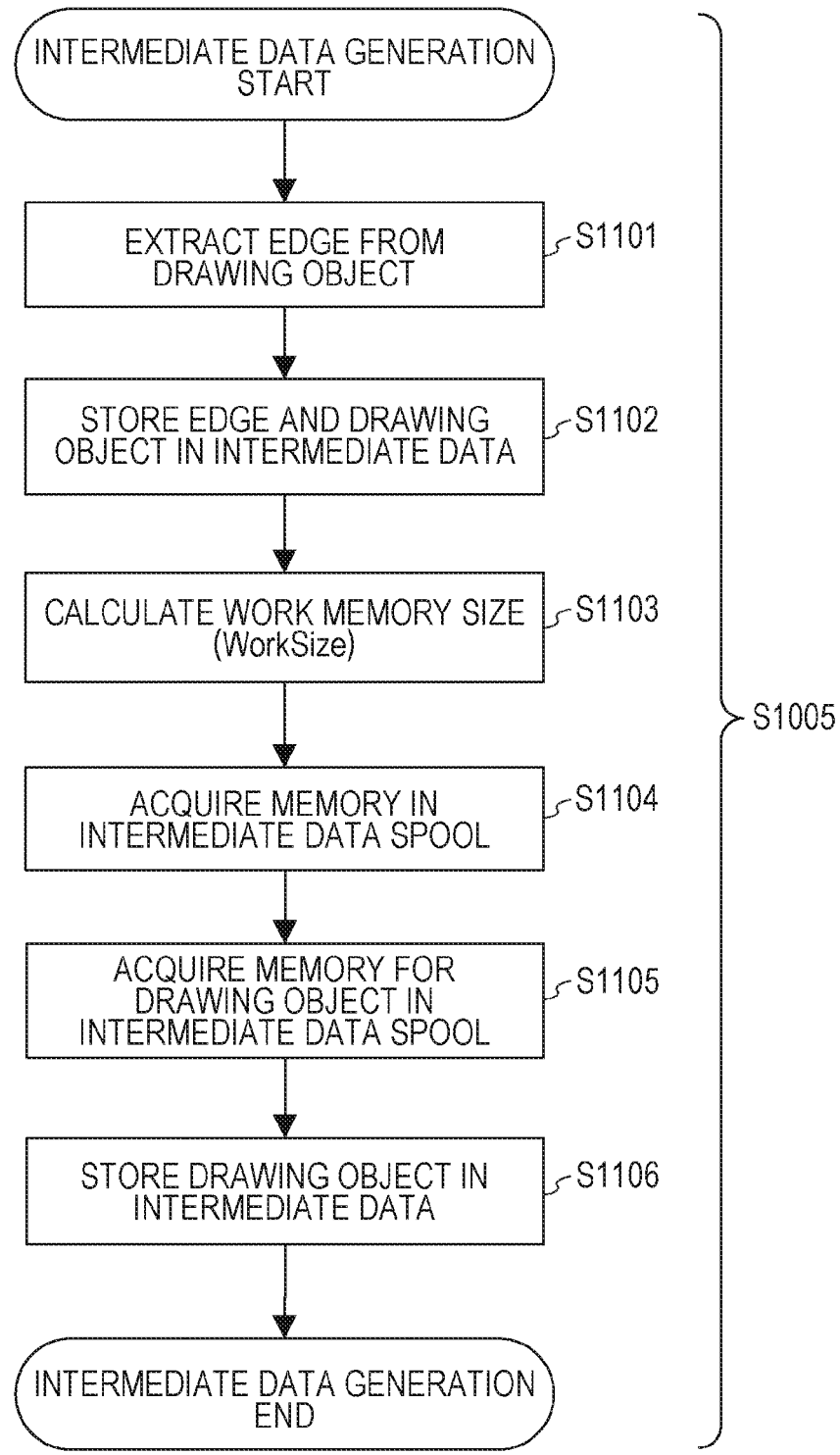
FIG. 5 is a flowchart illustrating the method for controlling the image processing apparatus according to one embodiment.

FIG. 5 is a flowchart illustrating the method for controlling the image processing apparatus indicating the present embodiment. This example is a detailed procedure of an intermediate data generation processing flow of S1005 illustrated in FIG. 4. Each step is implemented by the CPU 403 executing a stored control program. The following principally describes modules to be executed by the CPU 403 illustrated in FIG. 3.

The intermediate data generation unit 204 extracts an edge from a drawing object analyzed by the analysis processing unit 203 from the pagewise print data (S1101). The intermediate data generation unit 204 then stores the edge and the drawing object in the intermediate data spool 211 (S1102). Next, the intermediate data generation unit 204 estimates a size of a work memory necessary for development processing (S1103). The intermediate data generation unit 204 then acquires the memory in the intermediate data spool 211 (S1104). In addition, the intermediate data generation unit 204 acquires the memory that stores the edge extracted in S1101 and the drawing object in the intermediate data spool 211 (S1105). The intermediate data generation unit 204 then stores the edge and the drawing object in the intermediate data spool 211 (S1106), and ends the processing.

<Development Processing Flow>

Figure 6:
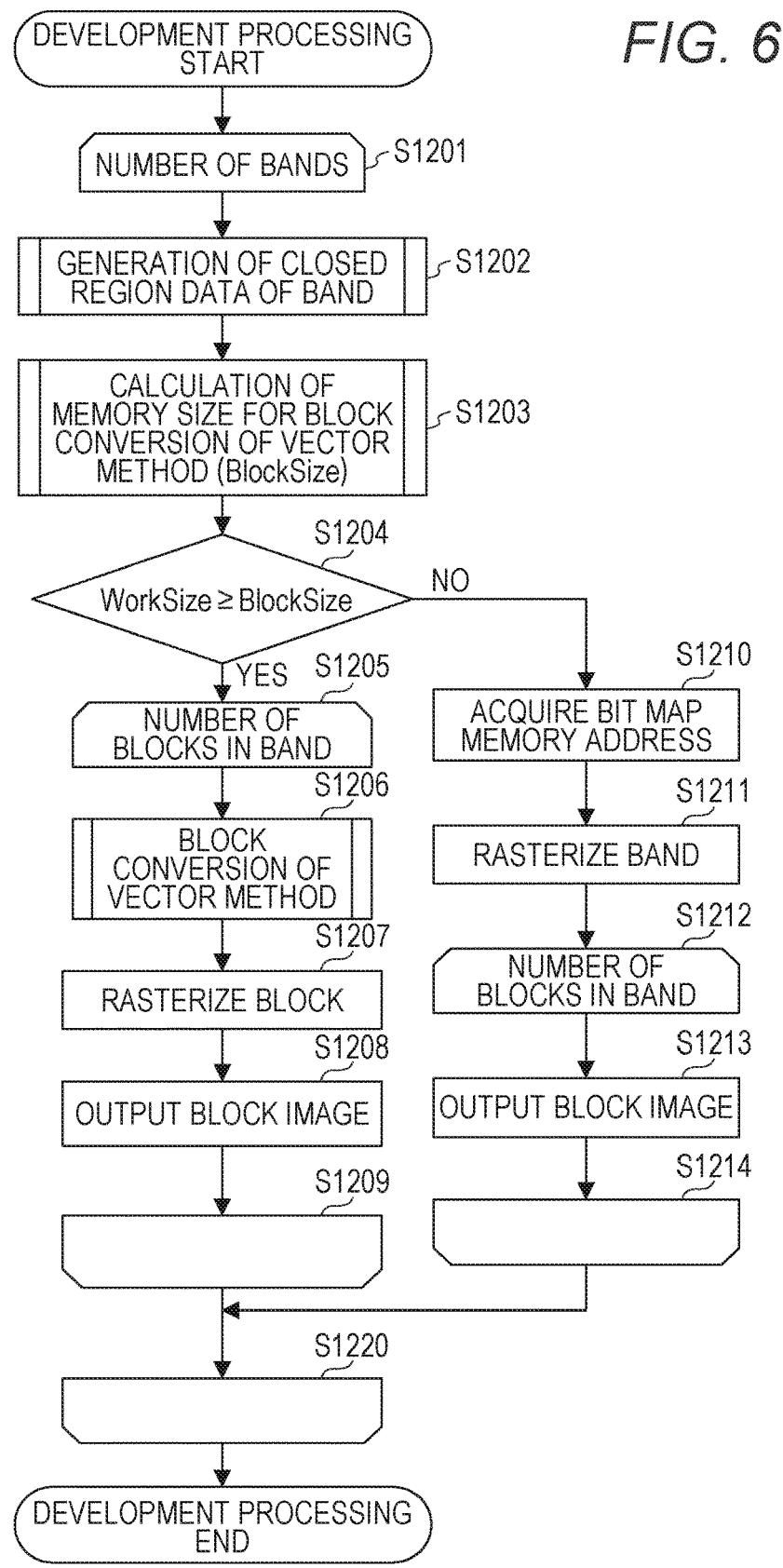
FIG. 6 is a flowchart illustrating the method for controlling the image processing apparatus according to one embodiment.

FIG. 6 is a flowchart illustrating the method for controlling the image processing apparatus indicating the present embodiment. This example is a detailed procedure of a development processing flow of S1007 illustrated in FIG. 4. Each step is implemented by the CPU 403 executing a stored control program. The following principally describes modules to be executed by the CPU 403 illustrated in FIG. 3. In the present embodiment, control is performed as follows. After first creation processing is started, when it is determined that a work memory size (WorkSize) that can be secured in the intermediate data spool 211 is larger than a predetermined threshold (BlockSize), block conversion processing of a vector method that is first conversion processing is performed. Meanwhile, when it is determined that the work memory size (WorkSize) that can be secured in the intermediate data spool 211 is smaller than the predetermined threshold (BlockSize), block conversion processing of a line method that is second creation processing is performed. Note that in the present embodiment, the first creation processing refers to processing for acquiring closed region data corresponding to a blockwise bit map image from closed region data of one band stored by the development processing unit 205 in the work memory, and generating the blockwise bit map image from the acquired closed region data. The first creation processing and the second creation processing will be described in detail below.

In the development processing, the development processing unit 205 processes all bands on a band-by-band basis (S1201 to S1220), further divides each band into blocks in the development processing, and outputs images of all blocks in the band (S1205 to S1209, S1212 to S1214). In the band-by-band processing, in S1201, the development processing unit 205 first generates closed region data of a band according to the number of bands (S1202). Specifically, the development processing unit 205 generates the closed region data of one band generated from the pagewise intermediate data.

Here, with reference to FIG. 14, one example of closed region data that is vector data will be described. For example, page 1 (not transparent) and page 2 (transparent) in which object 1, object 2, and objects 3 overlap in each page will be described by way of example. In the present embodiment, vector data includes information indicating regions divided by object contours called closed regions. Since each closed region on a line is also a section, closed region data of one band can also be said to be section data of a scan line that constitutes one band.

Therefore, closed region information on line 1 includes seven regions divided by contours like closed regions 621 to 627. Similarly, closed region information on line 2 also includes seven regions divided by contours like closed regions 631 to 637.

Each closed region data that constitutes the vector data includes closed region width (length information) of each of the closed regions 621 to 627 on line 1 and the closed regions 631 to 637 on line 2, the number of objects indicating the number of objects included in each of the closed regions, and object information in each of the closed regions indicated by the number of objects (see one example of closed region data 1400 and 1401 of FIG. 14). Here, closed region data 641 of line 1 is vector data of line 1, whereas closed region data 642 of line 2 is vector data of line 2. A size of closed region data of one line depends on the number of closed regions included in the one line and the number of objects included in (contributing to) each closed region.

Returning to description of FIG. 6, processing for the number of bands starts in S1201. In S1202, the development processing unit 205 performs generation processing of closed region data (vector data) of predetermined band height. Here, the development processing unit 205 stores sequentially the generated closed region data into a work memory, line by line. Subsequently, the development processing unit 205 calculates a memory size to be used for block conversion on the basis of the generated closed region data (S1203).

Next, the development processing unit 205 determines whether the memory size for block conversion calculated in S1203 (BlockSize) is equal to or less than a certain work memory size (WorkSize) secured in the intermediate data spool 211 (S1204).

Here, in a case where the development processing unit 205 determines that WorkSize≥BlockSize (block size), the development processing unit 205 performs block conversion of a vector method (first conversion processing) (S1206).

Next, the development processing unit 205 rasterizes the vector data that undergoes block conversion in S1206 (S1207), and the development processing unit 205 outputs a block image to the print processing unit 206 (S1208). This is processed for the number of blocks in the band (S1209), and furthermore, when the processing is completed for the number of bands (S1220), the development processing ends.

On the other hand, in a case where the development processing unit 205 determines in S1204 that BlockSize is larger than WorkSize, when the development processing unit 205 starts the first creation processing in the intermediate data spool 211 that stores the intermediate data, the development processing unit 205 acquires an address of the bit map memory previously secured in the work memory (S1210). Then, in order to perform the block conversion of a line method, the development processing unit 205 develops and stores band image data obtained by rasterizing, line by line, the band vector data in the bit map memory with the acquired address as an initial position (secured in the intermediate data spool 211) (S1211). This step S1211 may rasterize closed region data (vector data) already stored in work memory, line by line. Next, for the number of blocks in the band, the development processing unit 205 outputs the stored band image data to the print processing unit 206 on a block-by-block basis (S1212 to S1214), then the development processing unit 205 proceeds to S1220.

<Bit Map Memory Acquisition Flow>

Figure 7:
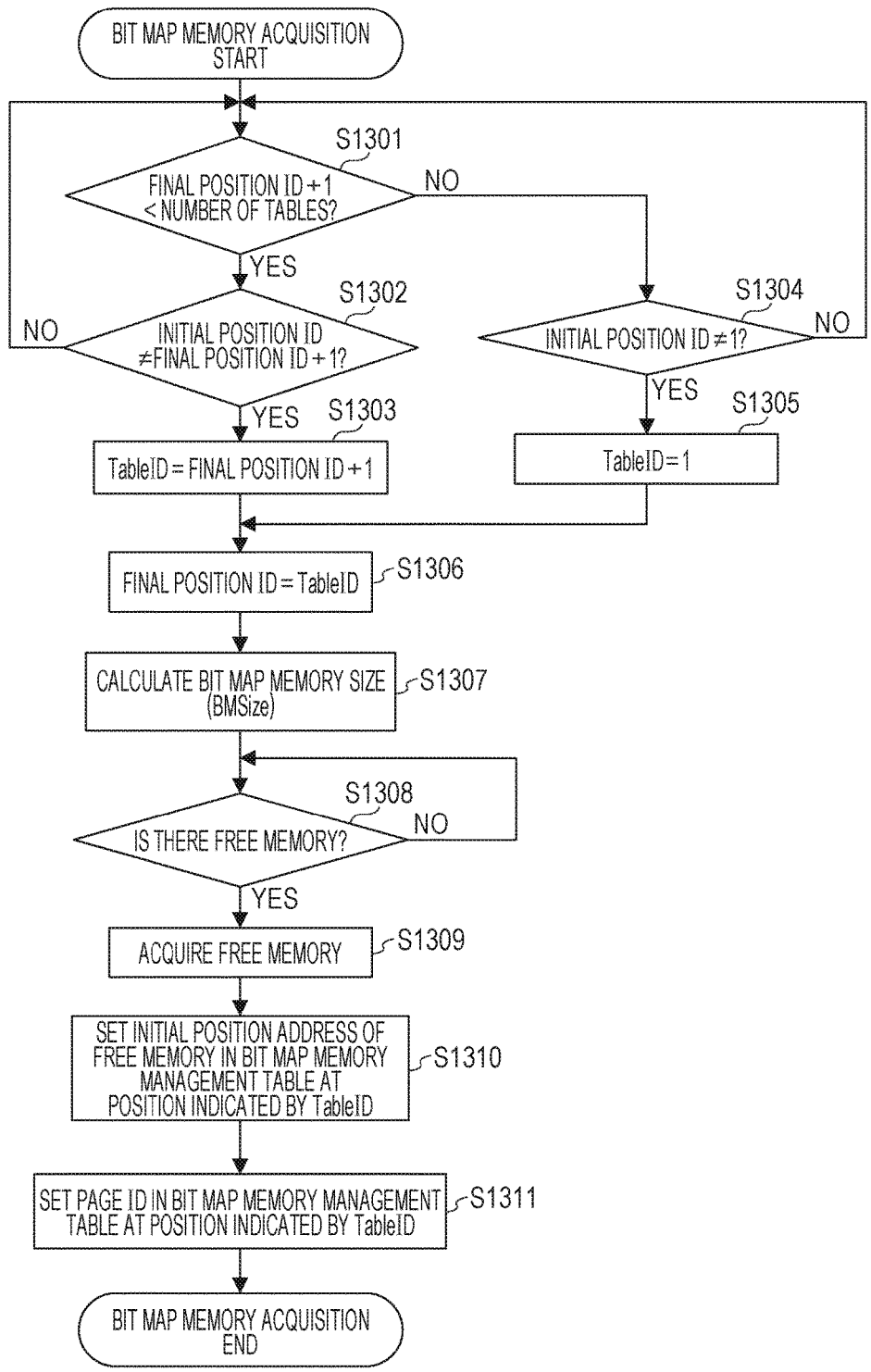
FIG. 7 is a flowchart illustrating the method for controlling the image processing apparatus according to one embodiment.

FIG. 7 is a flowchart illustrating the method for controlling the image processing apparatus indicating the present embodiment. This example is a detailed procedure of a bit map memory acquisition flow of S1003 illustrated in FIG. 4. Each step is implemented by the CPU 403 executing a stored control program. The following principally describes modules to be executed by the CPU 403 illustrated in FIG. 3.

To begin with, one example of bit map memory management information for managing the bit map memory secured in the intermediate data spool 211 will be described with reference to FIG. 9.

Figure 9:
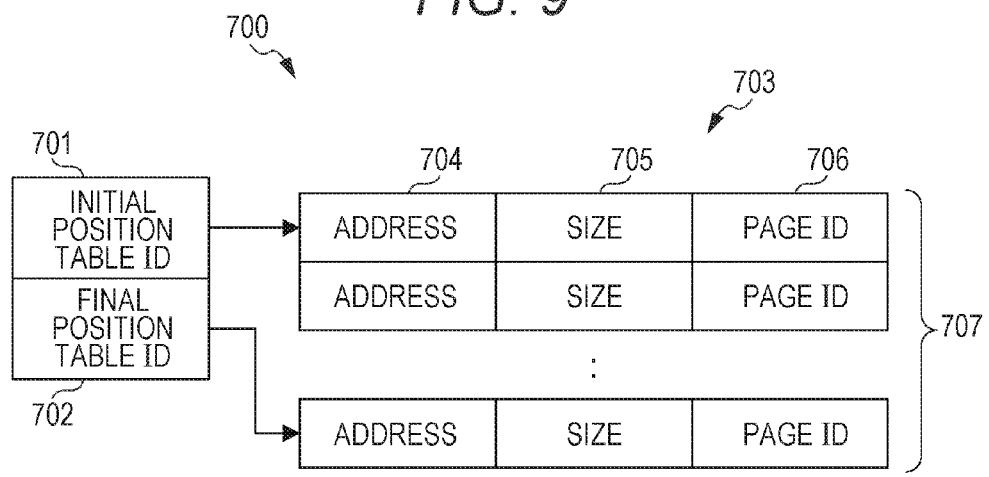
FIG. 9 is a diagram illustrating bit map memory management information according to one embodiment.

In FIG. 9, bit map memory management information 700 includes an initial position table ID 701, a final position table ID 702, and a plurality of bit map memory management tables 707. In the initial position table ID 701, an ID of the bit map memory management table is set in which bit map memory information firstly acquired in the intermediate data spool 211 during memory acquisition is registered. In the final position table ID 702, an ID of the bit map memory management table is set in which bit map memory information lastly acquired during memory acquisition is registered. Each of the bit map memory management tables 707 includes an address 704, a size 705, and a page ID 706 of the bit map memory.

To begin with, in response to a bit map memory acquisition request, the memory management unit 207 compares the final position table ID 702+1 of the bit map memory management information 700 illustrated in FIG. 9 with the number of tables (S1301). Here, the number of tables is the number of bit map memory management tables 707. When the memory management unit 207 determines that the number of tables is larger as a result of the comparison in S1301, the memory management unit 207 further compares the initial position table ID 701 with the final position table ID 702+1 (S1302). When the memory management unit 207 determines that the initial position table ID 701 differs from the final position table ID 702+1, the memory management unit 207 substitutes the final position table ID 702+1 for the parameter Table ID (S1303). On the other hand, when the memory management unit 207 determines that the final position table ID 702+1 of the bit map memory management information 700 is equal to or greater than the number of tables and that the initial position table ID 701 is other than 1 (S1304), the memory management unit 207 substitutes 1 for the parameter Table ID (S1305).

Next, the memory management unit 207 sets a value of the parameter Table ID in the final position table ID 702 of the bit map memory management information 700 (S1306). Furthermore, the memory management unit 207 calculates, by Equation 1 below, a bit map memory size of the band that is output by development processing (S1307).

$$\text{Bit map memory size (BMSize)} = \text{Height of band (block image)} \times \text{width of band} \times \text{number of channels} \quad \text{(Equation 1)}$$

In S1308, the memory management unit 207 determines whether a free memory equivalent to BMSize calculated by Equation 1 can be secured in the intermediate data spool 211 (S1308). When the memory management unit 207 determines that the free memory can be secured, the memory management unit 207 acquires the free memory in the intermediate data spool 211 (S1309).

Next, the memory management unit 207 sets the initial position address of the acquired free memory in the address 704 of the bit map memory management table at a position indicated by the parameter Table ID (S1310). Next, the memory management unit 207 sets the page ID 706 indicating the bit map memory to be used (S1311), and ends this processing.

<Bit Map Memory Release Flow>

Figure 8:
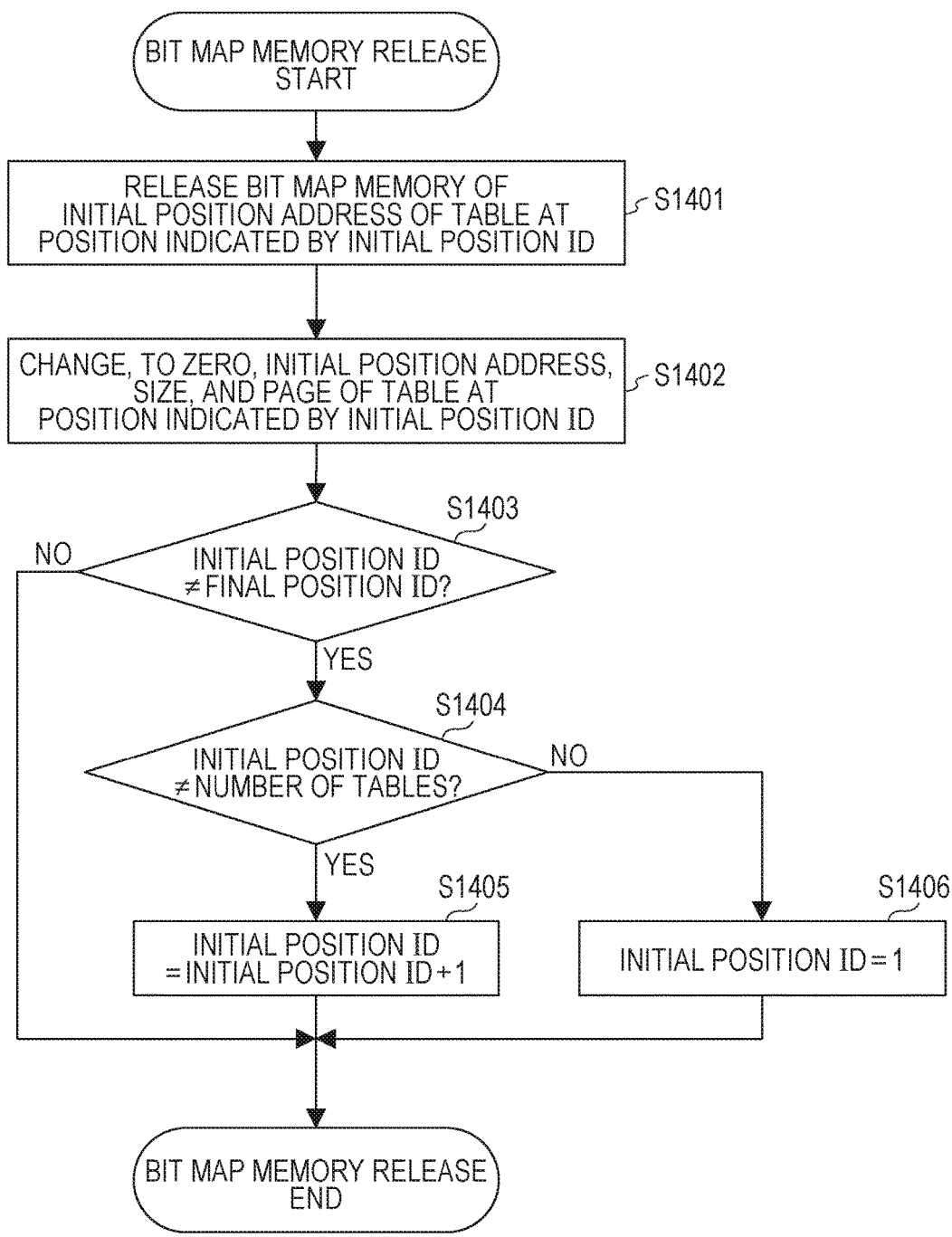
FIG. 8 is a flowchart illustrating the method for controlling the image processing apparatus according to one embodiment.

FIG. 8 is a flowchart illustrating the method for controlling the image processing apparatus indicating the present embodiment. This example is a detailed procedure of a bit map memory release flow of S1008 illustrated in FIG. 4. Each step is implemented by the CPU 403 executing a stored control program. The following principally describes modules to be executed by the CPU 403 illustrated in FIG. 3. In response to a bit map memory release request, the memory management unit 207 releases the bit map memory with reference to the address 704 of the bit map memory management table at a position indicated by the initial position table ID 701 (S1401). When the bit map memory release ends, the memory management unit 207 changes, to zero, the address 704, the size 705, and the page ID 706 of the table at a position indicated by the initial position table ID 701, and returns the information to an initial state (S1402).

Next, the memory management unit 207 compares the initial position table ID 701 with the final position table ID 702 (S1403). When the memory management unit 207 determines that the initial position table ID 701 differs from the final position table ID 702, the memory management unit 207 further compares the initial position table ID 701 with the number of tables (S1404). Here, when the memory management unit 207 determines that the initial position table ID 701 differs from the number of tables (=other than the last table), the memory management unit 207 adds 1 to the initial position table ID 701 (S1405), and ends this processing.

On the other hand, when the memory management unit 207 determines that the initial position table ID 701 is identical to the number of tables (=the last table), the memory management unit 207 sets 1 in the initial position table ID 701 (S1406), and ends this processing.

Figure 10A:
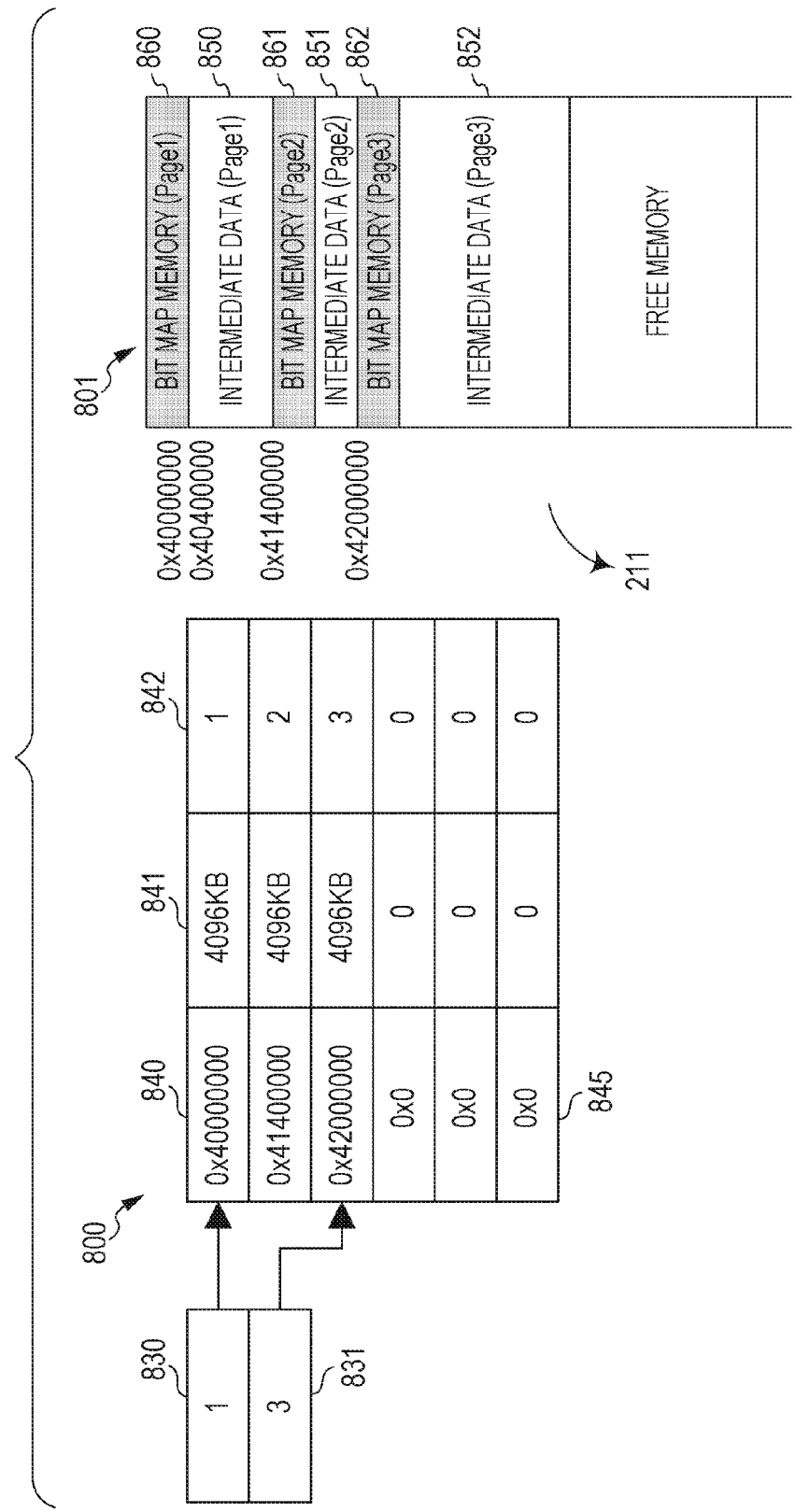
FIGS. 10A to 10C are diagrams each illustrating a bit map memory and intermediate data secured in a memory according to one embodiment.
Figure 10B:
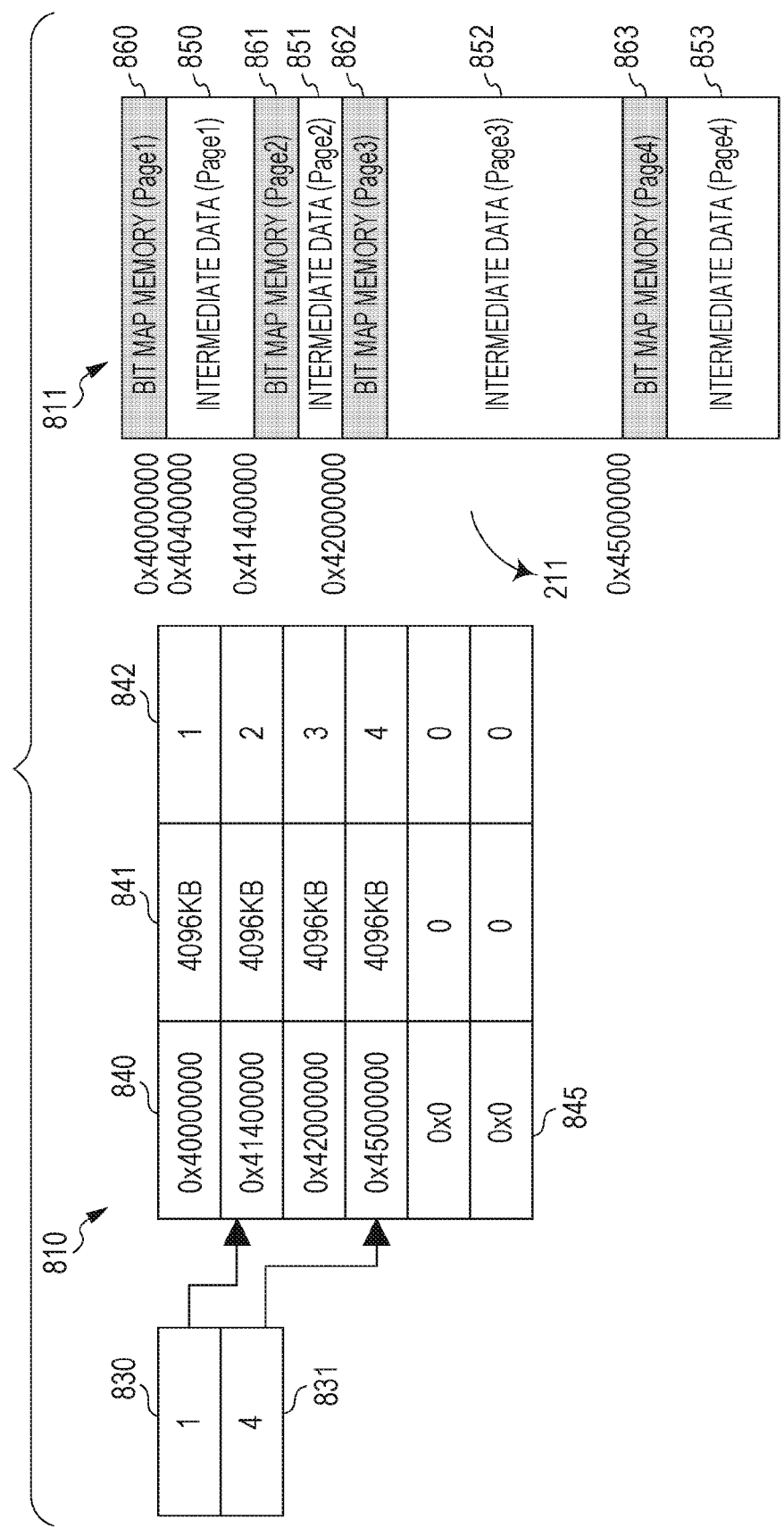
Figure 10C:
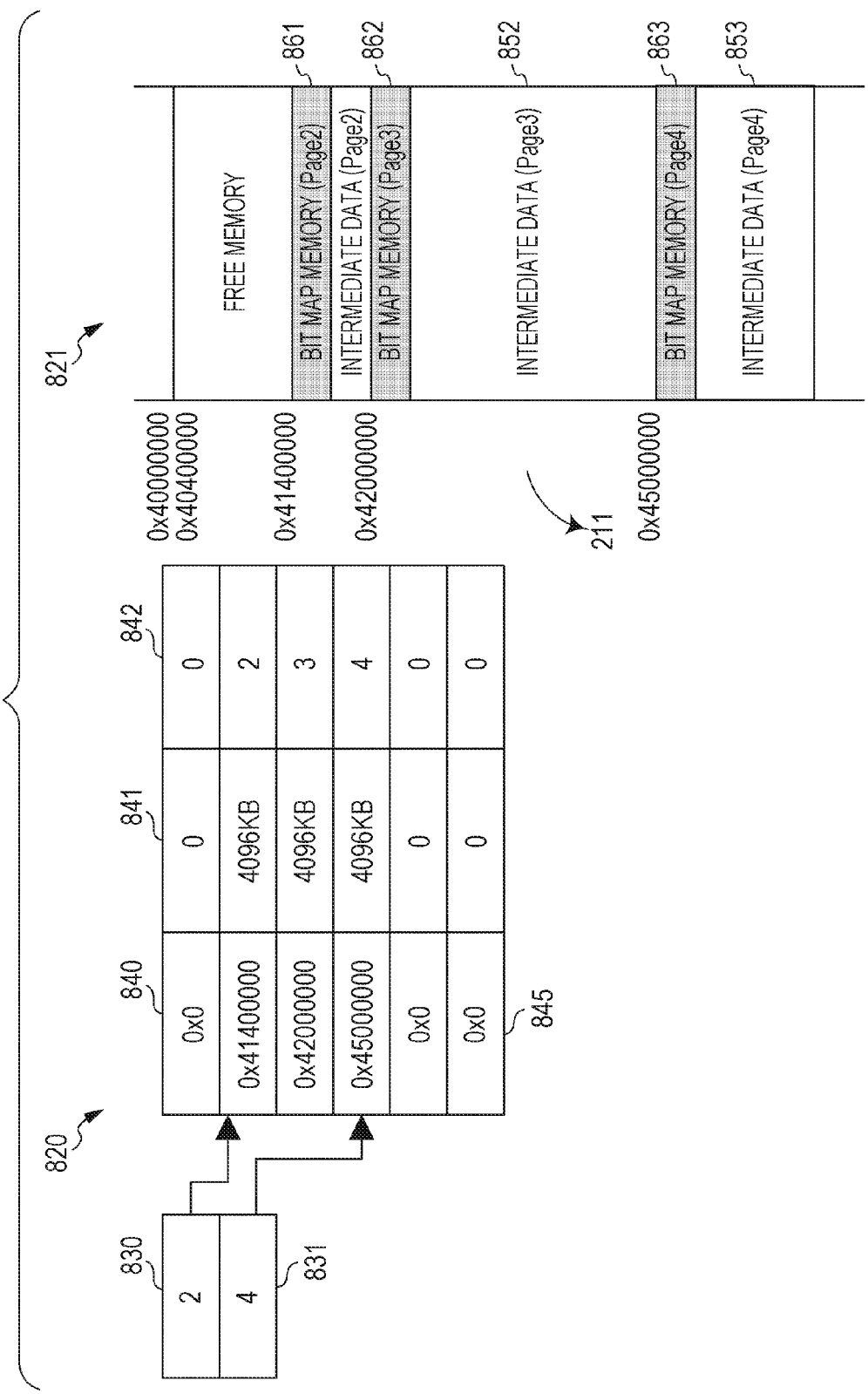

FIGS. 10A to 10C illustrate bit map memory management information 800, 810, and 820, respectively, and actual memories, that is, bit map memories 860 to 863 and intermediate data 850 to 852 secured in the intermediate data spool 211.

In FIG. 10A, it is assumed that the memory management unit 207 receives a bit map memory acquisition request (S1003 of FIG. 4) after generation of third page intermediate data 852 (bit map memory management information 800 and intermediate data spool memory 801) and after generation start of fourth page intermediate data 853 illustrated in FIG. 10B. In this case, the memory management unit 207 secures fourth page bit map memory 863 and the intermediate data 853 in the intermediate data spool memory 811 of the intermediate data spool 211 (the intermediate data spool memory 211 (see FIG. 10B)). The memory management unit 207 also changes a final position table ID 831 of the bit map memory management information 800 from 3 to 4 as illustrated in a final position table ID 831 of the bit map memory management information 810.

In addition, the memory management unit 207 sets an address 840, a size 841, and a page ID 842 of the bit map memory acquired in the fourth bit map memory management table 845 (bit map memory management information 810 (see FIG. 10B)).

Next, it is assumed that the first page development processing (S1007) ends and the memory management unit 207 receives the bit map memory release request (S1008).

In this case, as illustrated in FIG. 10C, the memory management unit 207 releases a bit map memory 860 and an intermediate data 850 that store the first page bit map image in the intermediate data spool memory 821 of the intermediate data spool 211. The memory management unit 207 then changes an initial position table ID 830 of the bit map memory management information 820 from 1 to 2.

At that time, the memory management unit 207 further initializes to zero the address 840, the size 841, and the page ID 842 of the bit map memory acquired in the first bit map memory management table 845 illustrated in FIG. 10A (bit map memory management information 820 (FIG. 10C)).

According to the present embodiment, when switching the first block forward conversion processing to the second block forward conversion processing, by previously securing the bit map memory to be used for development processing (work memory to be secured in the intermediate data spool 211) during generation of the intermediate data of each page, block forward conversion processing that does not cause waiting for a free memory during development processing can be implemented.

Second Embodiment

The first embodiment has described securing a bit map memory for each page during generation of intermediate data. Hereinafter, the second embodiment will describe an example of, when performing first tile conversion processing, previously acquiring a bit map memory to be used in common to pages in preparation for second tile conversion processing, and sharing between pages the bit map memory firstly secured by managing release information about the bit map memory.

<Bit Map Memory Acquisition Flow>

Figure 11:
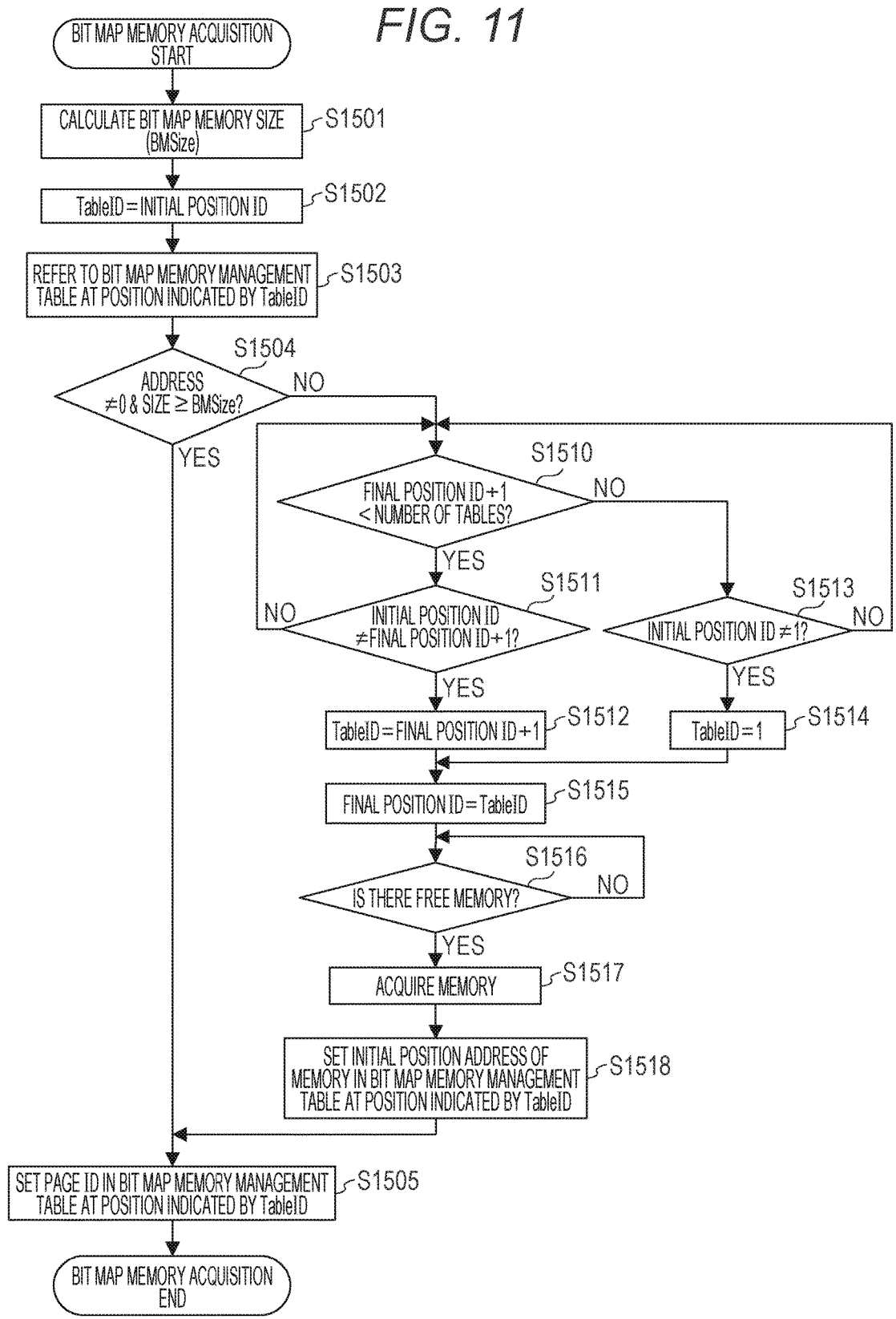
FIG. 11 is a flowchart illustrating the method for controlling the image processing apparatus according to one embodiment.

FIG. 11 is a flowchart illustrating a method for controlling an image processing apparatus indicating the present embodiment. This example is a detailed procedure of a bit map memory acquisition flow of S1003 illustrated in FIG. 4. Each step is implemented by a CPU 403 executing a stored control program. The following principally describes modules to be executed by the CPU 403 illustrated in FIG. 3.

In response to a request for bit map memory acquisition, a memory management unit 207 calculates a bit map memory size of a band to be output by development processing by Equation 1 described above (S1501).

Next, in order to check whether there is any bit map memory already secured, the memory management unit 207 refers to a bit map memory management table 1301 (FIG. 13) at a position indicated by an initial position table ID 1311 (S1502, S1503) to determine whether an address 1313 is other than zero and a size 1314 is equal to or greater than BMSize (S1504). Here, when the memory management unit 207 determines that the address 1313 is other than zero and the size 1314 is equal to or greater than BMSize, the memory management unit 207 updates a page ID 1315 at a position indicated by the initial position table ID 1311 (S1505).

On the other hand, when the memory management unit 207 determines otherwise in the determination of S1504, the memory management unit 207 compares a final position table ID 1312+1 of bit map memory management information 1300 illustrated in FIG. 13A with the number of tables (S1510). When the memory management unit 207 determines that the number of tables is larger as a result of this comparison, the memory management unit 207 further compares the initial position table ID 1311 with the final position table ID 1312+1 (S1511). Here, when the memory management unit 207 determines that the initial position table ID 1311 differs from the final position table ID 1312+1, the memory management unit 207 substitutes the final position table ID 1312+1 for the parameter Table ID (S1512).

On the other hand, when the memory management unit 207 determines that the final position table ID 1312+1 of the bit map memory management information 1300 is equal to or greater than the number of tables and that the initial position table ID 1311 is other than 1 (S1513), the memory management unit 207 substitutes 1 for the parameter Table ID (S1514). Then, the memory management unit 207 sets a value indicated by the parameter Table ID in the final position table ID 1312 of the bit map memory management information 1310 (S1515).

Next, the memory management unit 207 determines whether a free memory equivalent to BMSize calculated in S1501 can be secured in an intermediate data spool memory of an intermediate data spool 211 (S1516). When the memory management unit 207 determines that the free memory can be secured, the memory management unit 207 acquires the free memory equivalent to BMSize in the intermediate data spool memory of the intermediate data spool 211 (S1517).

Next, the memory management unit 207 sets an initial position address of the acquired free memory equivalent to BMSize in an initial position address 1313 of the bit map memory management table 1301 at a position indicated by the parameter Table ID (S1518). The memory management unit 207 also sets the page ID 1315 indicating a bit map memory 1314 to be used (S1505), and ends this processing.

<Bit Map Memory Release Flow>

Figure 12:
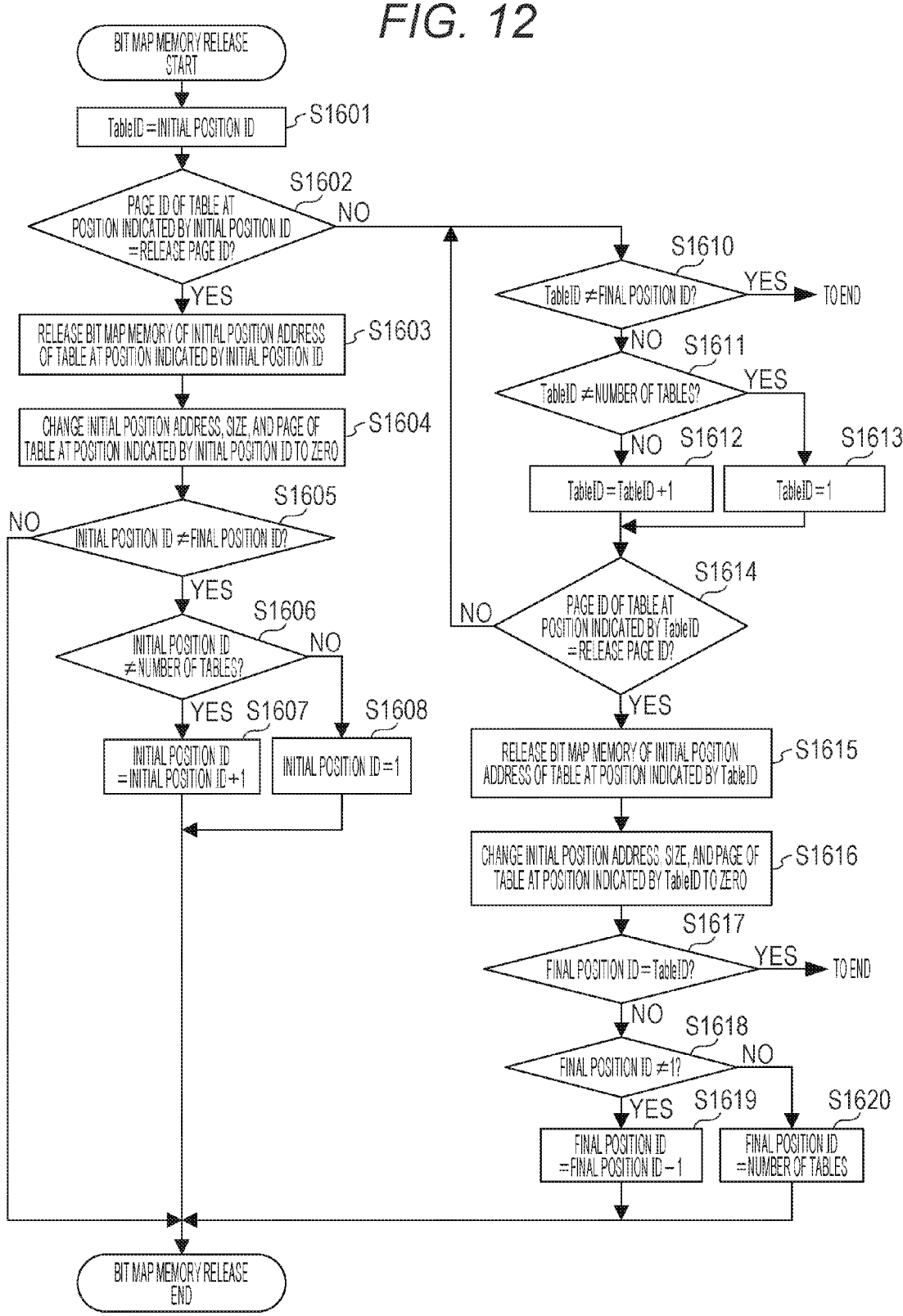
FIG. 12 is a flowchart illustrating the method for controlling the image processing apparatus according to one embodiment.

FIG. 12 is a flowchart illustrating the method for controlling the image processing apparatus indicating the present embodiment. This example is a detailed procedure of a bit map memory release flow of S1008. Each step is implemented by the CPU 403 executing a stored control program. The following principally describes modules to be executed by the CPU 403 illustrated in FIG. 3.

In response to a bit map memory release request, the memory management unit 207 refers to the bit map memory management information at a position indicated by the initial position table ID 1311 (S1601) to compare the page ID 1315 with a release page ID (S1602). Here, when the memory management unit 207 determines that the release page ID is identical to the page ID 1315, the memory management unit 207 refers to the address 1313 of first bit map memory management information 1310 of the initial position table ID1311 to release the bit map memory 1314 (S1603).

When the release of the bit map memory 1314 ends, the memory management unit 207 changes, to zero, the address 1313, the size 1314, and the page ID 1315 of the table at a position indicated by the initial position table ID 1311, and returns the information to an initial state (S1604).

Next, the memory management unit 207 compares the initial position table ID 1311 with the final position table ID 1312 (S1605). When the memory management unit 207 determines that the initial position table ID 1311 differs from the final position table ID 1312, the memory management unit 207 further compares a value indicated by the initial position table ID 1311 with the number of tables (S1606). Here, when the memory management unit 207 determines that the initial position table ID 1311 differs from the number of tables (=other than the last table), the memory management unit 207 adds 1 to the page ID 1315 of the initial position table ID 1311 (S1607), and ends this processing.

On the other hand, when the memory management unit 207 determines that the value indicated by the initial position table ID 1311 is identical to the number of tables (=the last table), the memory management unit 207 sets 1 in the page ID 1315 of the initial position table ID 1311 (S1608), and ends this processing.

On the other hand, when the memory management unit 207 determines in S1602 that the page ID 1315 differs from the release page ID, the memory management unit 207 refers to the bit map memory management information 910 at a position indicated by the final position ID identified by the final position table ID 1312 (S1610), and repeatedly executes S1610 to S1614 until the bit map memory management table 1301 of the page ID 1315 identical to the release page ID is found (S1614).

Then, when the memory management unit 207 determines that the bit map memory management table 1301 of the page ID 1315 identical to the release page ID is found (S1614), the memory management unit 207 releases the bit map memory 1314 with reference to the address 1313 of the bit map memory management table 1301 (S1615).

Thus, after the release of the bit map memory ends, the memory management unit 207 changes, to zero, the address 1313, the size 1314, and the page ID 1315 of the initial position table ID 1311, and returns the information to an initial state (S1616).

Next, the memory management unit 207 compares a value indicated by the final position table ID 1312 with the number of tables (S1617). When the memory management unit 207 determines that the value indicated by the final position table ID 1312 differs from the number of tables, the memory management unit 207 further determines whether a value indicated by the page ID 1315 of the final position table ID 1312 is 1 (S1618). When the memory management unit 207 determines that the value indicated by the page ID 1315 of the final position table ID 1312 is not 1 (=other than the initial position table), the memory management unit 207 subtracts 1 from the page ID 1315 of the final position table ID 1312 (S1619), and ends this processing.

On the other hand, when the memory management unit 207 determines that the value indicated by the page ID 1315 of the final position table ID1312 is 1 (=initial position table), the memory management unit 207 sets the number of tables in the final position table ID 1312 (S1620), and ends this processing.

FIG. 13 illustrates the bit map memory management information 1300 and 1310, and the bit map memory 1314 and intermediate data 1316, 1317, and 1319 secured in the actual intermediate data spool 211.

In FIG. 13, in a state after the third page intermediate data is generated (bit map memory management information 800 and 810), in bit map memory management information 1300 and 1310 corresponding to a state after the first page intermediate data is generated, after generation of the second, third, and fourth page intermediate data 1317, 1318, and 1319 starts, it is assumed that the memory management unit 207 receives a bit map memory acquisition request (S1003). In this case, only the fourth page intermediate data 1319 is secured in the intermediate data spool 211, and the memory management unit 207 can use the bit map memory 1314 secured on the first page as it is, by only updating the page ID 1315 of the bit map memory management table 1301 from 1 to 4.

Thus, when first conversion processing is switched to second conversion processing, the bit map memory to be used for development processing accompanying the second conversion processing is secured in advance during generation of the intermediate data, and it is determined whether the bit map memory has already been secured on a previous page. This makes it possible to control the size of used bit map memory.

Other Embodiments

Embodiment(s) of the present disclosure can also be realized by a computer of a system or apparatus that reads out and executes computer executable instructions (e.g., one or more programs) recorded on a storage medium (which may also be referred to more fully as a 'non-transitory computer-readable storage medium') to perform the functions of one or more of the above-described embodiment(s) and/or that includes one or more circuits (e.g., application specific integrated circuit (ASIC)) for performing the functions of one or more of the above-described embodiment(s), and by a method performed by the computer of the system or apparatus by, for example, reading out and executing the computer executable instructions from the storage medium to perform the functions of one or more of the above-described embodiment(s) and/or controlling the one or more circuits to perform the functions of one or more of the above-described embodiment(s). The computer may comprise one or more processors (e.g., central processing unit (CPU), micro processing unit (MPU)) and may include a network of separate computers or separate processors to read out and execute the computer executable instructions. The computer executable instructions may be provided to the computer, for example, from a network or the storage medium. The storage medium may include, for example, one or more of a hard disk, a random-access memory (RAM), a read only memory (ROM), a storage of distributed computing systems, an optical disk (such as a compact disc (CD), digital versatile disc (DVD), or Blu-ray Disc (BD)™), a flash memory device, a memory card, and the like.

While exemplary embodiments have been described, it is to be understood that the present disclosure is not limited to the disclosed exemplary embodiments. The scope of the following claims is to be accorded the broadest interpretation so as to encompass all such modifications and equivalent structures and functions.

This application claims the benefit of Japanese Patent Application No. 2016-154834, filed Aug. 5, 2016, which is hereby incorporated by reference herein in its entirety.

What is claimed is:

1. An image processing apparatus for storing, in an intermediate data memory, intermediate data generated from print data, and processing the intermediate data, the image processing apparatus comprising:
   one or more controllers having at least one processor that executes instructions stored in a memory, the one or more controllers configured to function as:
   a generation unit configured to generate closed region data of one band generated from pagewise intermediate data;
   a first creation unit configured to store the closed region data of one band generated by the generation unit in a work memory allocated in the intermediate data memory and to create a blockwise bit map image from the stored closed region data of one band;
   a second creation unit configured to develop a bit map image of one band from the closed region data of one band generated from the pagewise intermediate data in the work memory allocated in the intermediate data memory, the second creation unit being configured to create a blockwise bit map image from the bit map image of one band developed in the work memory;
   a determination unit configured to determine whether a size of the work memory allocated in the intermediate data memory exceeds a block size to be used for block conversion;
   a control unit configured, when the determination unit determines that the size of the work memory exceeds the block size, to switch processing by the first creation unit to create a bit map, to processing by the second creation unit to create a bit map;
   a memory management unit configured, when the first creation unit starts processing for creating a bit map, to previously allocate a bit map memory to be used by the second creation unit in the work memory; and
   an output unit configured to output an image based on the bit map stored in the bit map memory,
   wherein when the first creation unit starts processing for creating a bit map, the memory management unit allocates, in the work memory, one bit map memory to be in common use among pages to be used by the second creation unit.

2. The image processing apparatus according to claim 1, wherein when the control unit switches the processing by the first creation unit to create a bit map, to the processing by the second creation unit to create a bit map, the second creation unit creates the blockwise bit map image from the bit map image of one band by using the bit map memory allocated by the memory management unit.

3. The image processing apparatus according to claim 1, wherein when the first creation unit starts processing for creating a bit map, the memory management unit allocates, in the work memory, the bit map memory to be used by the second creation unit for each page.

4. The image processing apparatus according to claim 1, wherein the first creation unit acquires closed region data corresponding to the blockwise bit map image from the closed region data of one band stored in the work memory, and the first creation unit generates the blockwise bit map image from the acquired closed region data.

5. The image processing apparatus according to claim 1, further comprising a printer device that print the image, outputted by the output unit, on a sheet.

6. A method of processing intermediate data generated from print data for a predetermined area by using one or more controllers having at least one processor that executes instructions stored in a memory, comprising:
   reserving a memory area as a reserved memory area;
   receiving the intermediate data, line by line;
   starting a first rendering process for the intermediate data, wherein the first rendering process performs storing the intermediate data into a predetermined memory area, and rendering the intermediate data stored for the predetermined area, block by block, to output the rendered block data;
   during the first rendering process, checking data size of the intermediate data for at least one line;
   when the checked data size does not meet a predetermined requirement, stopping the first rendering process to start a second rendering process for the intermediate data, wherein the second rendering process performs rendering the intermediate data, line by line, to store the rendered line data into the reserved memory area; and
   output an image based on the rendered block data or the rendered line data,
   wherein the second rendering process performs the rendering using a piece of the intermediate data stored in the predetermined memory area and a remaining piece of the received intermediate data not stored in the predetermined memory.

7. The method according to claim 6, wherein the second rendering process does not store the intermediate data into the predetermined memory area.

8. The method according to claim 6, wherein a block comprises a plurality of short lines shorter than the line.

9. The method according to claim 6, wherein the method performs the reserving before the starting of the first rendering process.

10. A method of processing according to claim 6, wherein the image is for a print process by a printer device.

11. A method of processing intermediate data generated from print data for a predetermined area by using one or more controllers having at least one processor that executes instructions stored in a memory, comprising:
    reserving a memory area as a reserved memory area;
    receiving the intermediate data, line by line;
    starting a first rendering process for the intermediate data, wherein the first rendering process performs storing the intermediate data into a predetermined memory area, and rendering the intermediate data stored for the predetermined area, block by block, to output the rendered block data;
    during the first rendering process, checking data size of the intermediate data for at least one line;
    when the checked data size does not meet a predetermined requirement, stopping the first rendering process to start a second rendering process for the intermediate data, wherein the second rendering process performs rendering the intermediate data, line by line, to store the rendered line data into the reserved memory area;
output an image based on the rendered block data or the rendered line data,
wherein the second rendering process does not store the intermediate data into the predetermined memory area.

12. A method of processing according to claim 11, wherein the image is for a print process by a printer device.

* * * * *